(12) United States Patent
Kim

(10) Patent No.: US 9,252,407 B2
(45) Date of Patent: Feb. 2, 2016

(54) BATTERY MODULE

(75) Inventor: Myung-Chul Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 680 days.

(21) Appl. No.: 13/137,955

(22) Filed: Sep. 22, 2011

(65) Prior Publication Data

US 2013/0004813 A1    Jan. 3, 2013

(30) Foreign Application Priority Data

Jun. 29, 2011    (KR) .................. 10-2011-0063653

(51) Int. Cl.
| | | |
|---|---|---|
| *H01M 2/12* | (2006.01) | |
| *H01M 2/10* | (2006.01) | |
| *H01M 10/647* | (2014.01) | |
| *H01M 10/6557* | (2014.01) | |
| *H01M 10/613* | (2014.01) | |

(52) U.S. Cl.
CPC .......... *H01M 2/1077* (2013.01); *H01M 2/1217* (2013.01); *H01M 10/613* (2015.04); *H01M 10/647* (2015.04); *H01M 10/6557* (2015.04)

(58) Field of Classification Search
CPC ............ H01M 2/0443; H01M 2/0447; H01M 2/1217; H01M 2/1252
USPC ........................ 429/7, 72, 82, 87, 88, 96–100
See application file for complete search history.

(56) References Cited

U.S. PATENT DOCUMENTS

| | | | |
|---|---|---|---|
| 2005/0170238 A1 | 8/2005 | Isa et al. | |
| 2008/0145754 A1* | 6/2008 | Partington et al. | ............ 429/185 |
| 2010/0075213 A1* | 3/2010 | Mehta et al. | .................. 429/120 |

FOREIGN PATENT DOCUMENTS

| | | |
|---|---|---|
| JP | 2009-0170258 A | 7/2009 |
| JP | 2010-055957 | 3/2010 |
| JP | 2010-080352 A | 4/2010 |
| JP | 2010-0086773 A | 4/2010 |
| JP | 2010-097910 | 4/2010 |
| JP | 2010-0205509 A | 9/2010 |

OTHER PUBLICATIONS

Korean Office Action Dated Nov. 22, 2012.
Korean Notice of Allowance dated May 29, 2013 for KR 10-2011-0063653, Kim.

* cited by examiner

*Primary Examiner* — Basia Ridley
*Assistant Examiner* — James Erwin
(74) *Attorney, Agent, or Firm* — Lee & Morse, P.C.

(57) ABSTRACT

A battery module including a plurality of battery cells and a cover, each battery cell having a vent portion aligned in one direction, and the cover being over the vent portions, the cover including an internal cavity and at least a portion of the internal cavity including a heat-resistance member.

20 Claims, 5 Drawing Sheets

BATTERY MODULE

BACKGROUND

1. Field

One or more embodiments relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

A battery cell includes an electrolyte and an electrode assembly composed of a positive electrode plate and a negative electrode plate, and generates energy through an electrochemical reaction of these electrode plates and the electrolyte. Gas may be generated as a side reaction of the electrochemical reaction in the interior of the battery cell.

SUMMARY

One or more embodiments may provide a battery module including a plurality of battery cells, each battery cell having a vent portion aligned in one direction; and a cover over the vent portions, the cover including an internal cavity, and at least a portion of the internal cavity including a heat-resistance member.

The battery module may further include an insulation member interposed between the vent portions and the cover.

The cover may be mounted on the battery cells, have a hexahedral shape defining the internal cavity, the hexahedral shape having one side open, and the open side facing the vent portions.

The heat-resistance member may cover the entire internal cavity of the cover.

The heat-resistance member may be only on portions of the internal cavity of the cover corresponding in position provided to the vent portions.

The internal cavity may include at least one rib extending along a length of the cover. The rib may include contact portions and non-contact portions, the contact portions contacting and pressing against an insulation member, and the non-contact portions overlapping the vent portions. The heat resistance member may be on outer surfaces of the ribs and an entire inner surface of the internal cavity. The heat-resistance member may be only on the non-contact portion.

The heat-resistance member may be configured to withstand a high temperature of about 100° C. to about 700° C. and is at least one of a heat-resistance tape, an insulation coated metal plate and a heat-resistance paint.

The insulation member may be interposed between the vent portions and the cover, the insulation member being a single unit. The insulation member may be interposed between the vent portions and the cover, the insulation member having a plurality of openings corresponding in position to the vent portions. The size of the openings may be the same as the vent portions or larger than the vent portions. The insulation member may be interposed between the vent portions and the cover, the insulation member including a heat-resistance material. The insulation member may be interposed between the vent portions and the cover, the insulation member being a gasket. The insulation member may be interposed between the vent portions and the cover, the width of the insulation member may be wider than that of the cover. The insulation member may be interposed between the vent portions and the cover, the cover forming a flow path of the gas by exiting the insulation member.

The cover may further include an outlet extending from one side of the cover.

The battery module may further include a housing that accommodates the plurality of battery cells. The housing may include a pair of end plates spaced apart from each other to accommodate the plurality of battery cells therebetween, side brackets that connect side surfaces of the end plates to each other, and a bottom bracket that connects bottom surfaces of the end plates to each other. At least a portion of the heat resistance member may overlap the vent portions.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
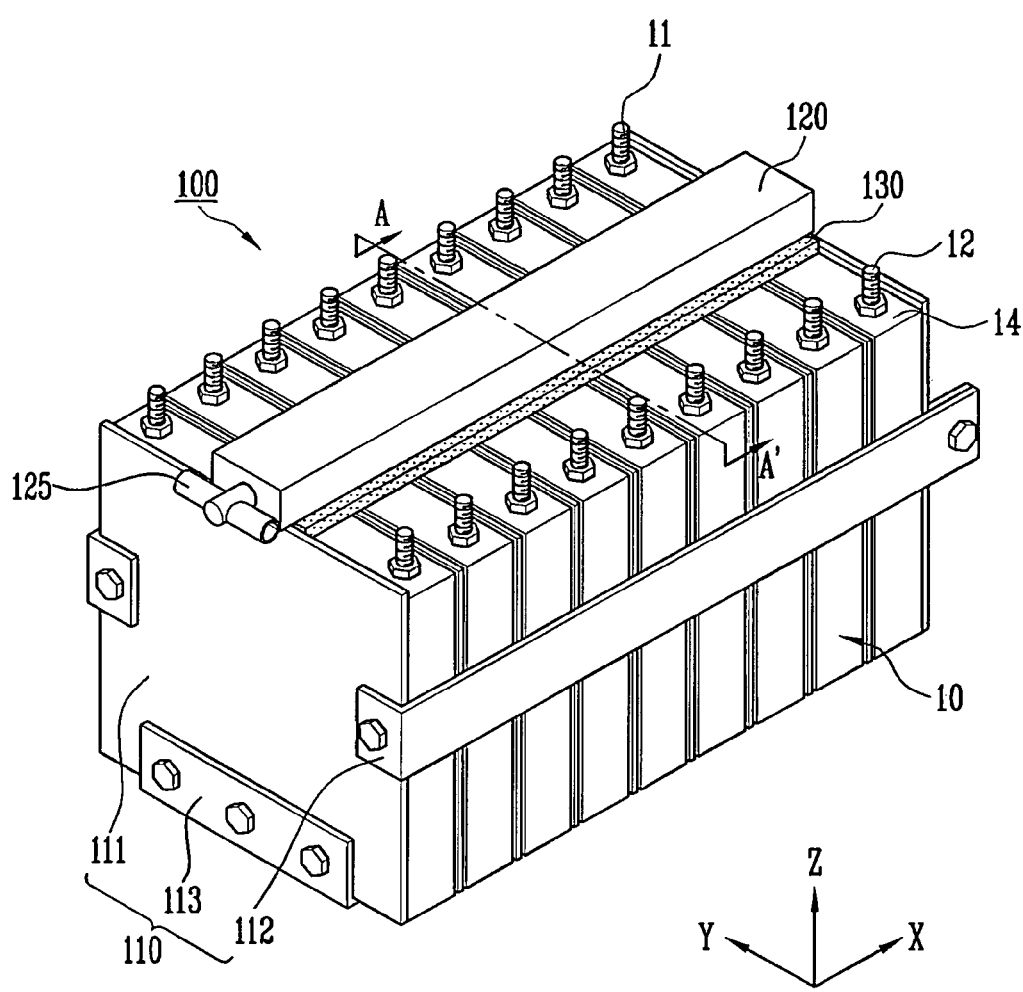
FIG. 1 illustrates a perspective view of a battery module according to a first embodiment.

Korean Patent Application No. 10-2011-0063653, filed on Jun. 29, 2011, in the Korean Intellectual Property Office, and entitled: "Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Also, when an element is referred to as being "connected to" another element, it can be directly connected to another element or be indirectly connected to the another element with one or more intervening elements interposed therebetween. Like reference numerals refer to like elements throughout.

Hereinafter, a battery module according to a first embodiment will be described with reference to FIGS. 1 to 4.

Figure 2:
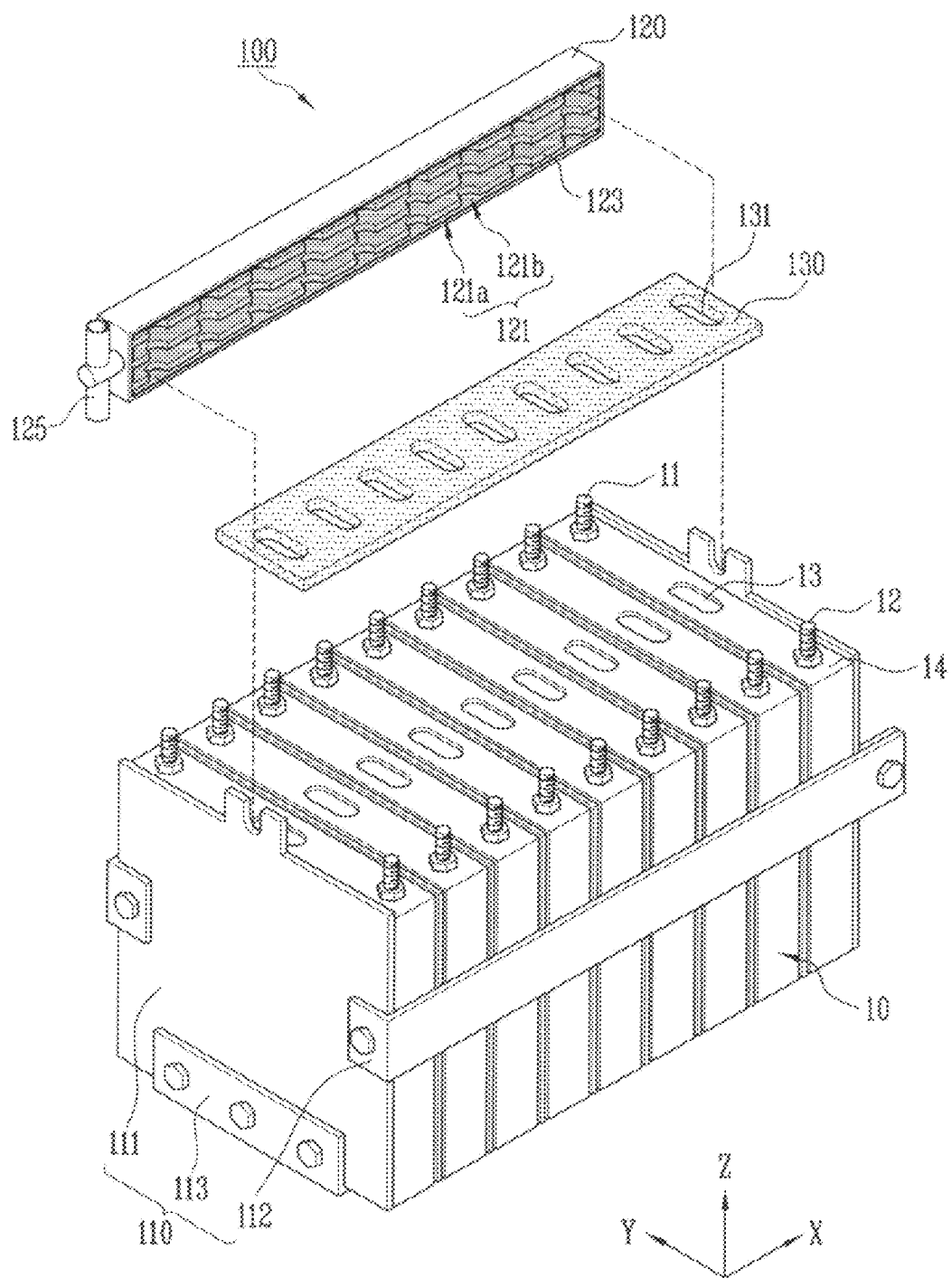
FIG. 2 illustrates an exploded perspective view of the battery module shown in FIG. 1.
Figure 3A:
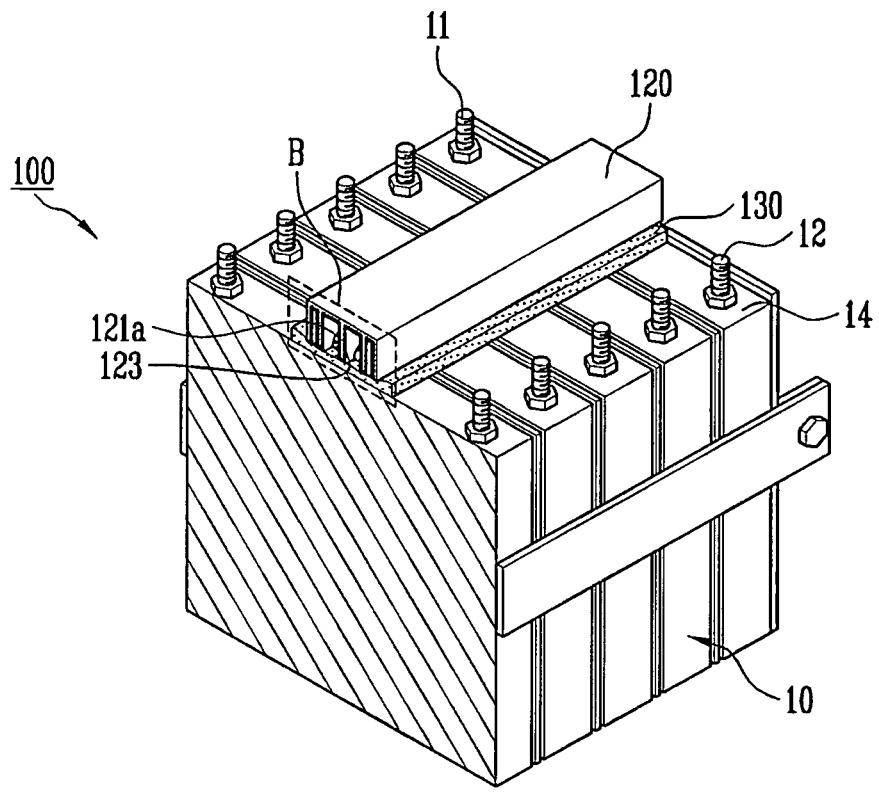
FIG. 3A illustrates a partial perspective view taken along line A-A of FIG. 2.
Figure 3B:
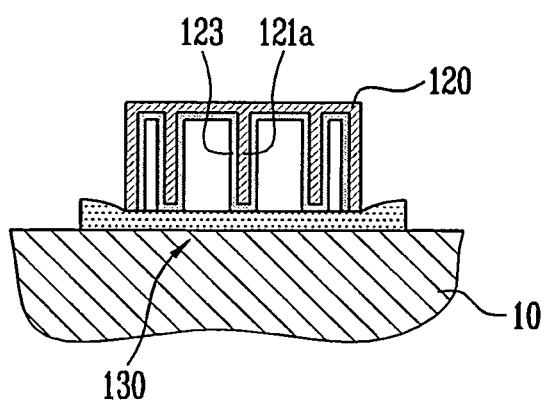
FIG. 3B illustrates an enlarged sectional view of part B in FIG. 3B.
Figure 4:
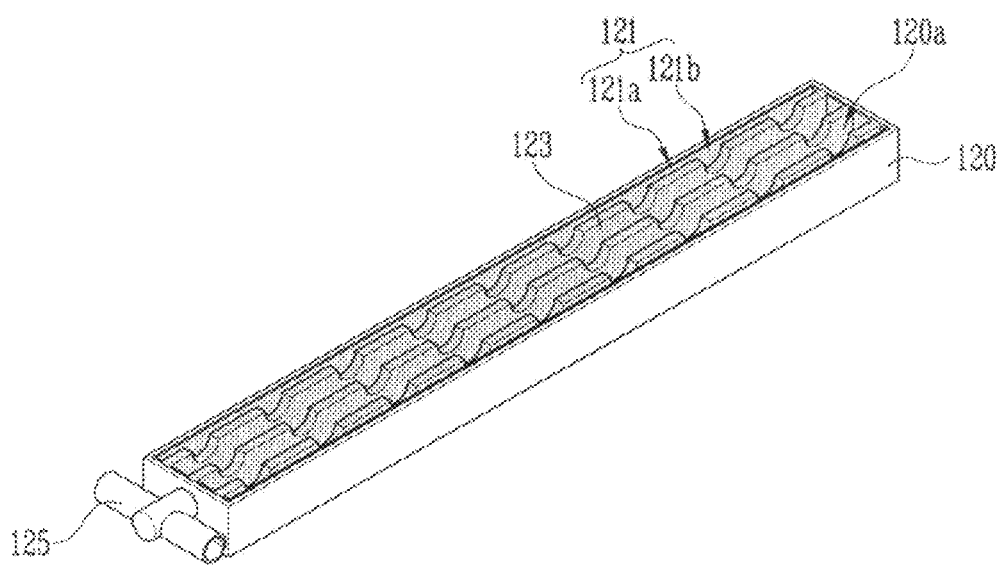
FIG. 4 illustrates a perspective view of a rotated cover according to the first embodiment.

FIG. 1 illustrates a perspective view of a battery module according to a first embodiment. FIG. 2 illustrates an exploded perspective view of the battery module shown in FIG. 1. FIG. 3A illustrates a partial perspective view taken along line A-A of FIG. 2. FIG. 3B illustrates an enlarged sectional view of FIG. 3B. FIG. 4 illustrates a perspective view of a rotated cover according to the first embodiment.

Referring to FIGS. 1 and 2, the battery module 100 according to an embodiment may include a plurality of battery cells 10, each battery cell 10 having a vent portion 13 through which gas is exhausted, and a cover 120 that covers the vent portions 13. The plurality of battery cells 10 may be aligned in one direction. The cover 120 may include a heat-resistance member 123 formed in the internal cavity of the cover 120.

The cover 120 may have the shape of a hexahedron with one side opened in one direction. An internal cavity 120a of the cover 120 (FIG. 4) may be exposed through the opened side. The cover 120 may be mounted on the battery cells 10 such that the opened side of the cover 120 faces the vent portions 13, e.g., a single cover 120 may cover a plurality of vent portions 13 of corresponding battery cells 10. The cover 120 may include an outlet 125 for gas at one end thereof. The cover 120 may closely contact the insulation member 130. As such, the cover 120 may form a flow path of gas that is connected to the outlet 125. For example, gas that exits the insulation member 130 may flow through the cover 120 to the outlet 125.

At least one rib 121 may be formed in the internal cavity 120a of the cover 120. The rib 121 may extend along the length, e.g., an entire length, of the cover 120, e.g., along the x-axis. The rib 121 may have contact portions 121a that contact the insulation member 130 and non-contact portions 121b between the contact portions 121a that correspond in position to the vent portions 13, e.g., one non-contact portion 121b may be between two adjacent contact portions 121a along the x-axis. For example, non-contact portions 121b may be shorter than contact portions 121a along the z-axis, so non-contact portions 121b may not contact the insulation member 130 and may define a space above a respective vent portion 13. The cover 120 may have a shape that is the same as or about the same as the shape of the insulation member 130, which is described below. The heat resistance member 123 may be either continuous in the cover, e.g., on an entire inner surface of the cover 120 and ribs 121, or discontinuous, i.e., including separate portions, which correspond in position with, e.g., overlap, the vent portions. An insulation member 130 may be interposed between the vent portions 13 and the cover 120.

According to one or more embodiments, the cover 120 may include a plurality of ribs 121. The ribs 121 may be formed in the internal cavity 120a of the cover 120, so that the sealing performance between the cover 120 and the insulation member 130 may be improved. For example, the ribs 121 may facilitate achieving a tighter seal between the cover 120 and the insulation member 130. The non-contact portions 121b of the ribs 121 may have open portions that correspond in position to openings 131 of the insulation member 130. The contact portions 121a of the ribs 121 may contact portions of the insulation member 130 between adjacent openings 131 along the x-axis, thereby pressurizing or pressing against the insulation member 130. The openings 131 may correspond in position to the vent portions 13. The non-contact portions 121b of the ribs 121 may include open portions or concave edges. The concave edges of the non-contact portions 121b may be spaced from edges of adjacent contact portions 121a.

As such, the non-contact portions 121b may not interrupt the exhaustion of gas, or block a flow of gas, passing through the openings 131 of the insulation member 130. The contact portions 121a of the ribs 121 may contact the insulation member 130 between the openings 131 while pressurizing or pressing against the insulating member 130. As such, the sealing performance or seal between the cover 120 and the insulation member 130 may be improved or enhanced.

Referring to FIGS. 3A to 4, the width of the insulation member 130 may be wider than that of the cover 120 along the y-axis (FIG. 1), so as to improve or enhance the seal between the cover 120 and the insulation member 130. As shown in FIG. 3B, outermost portions of the cover 120 may contact the insulation member 130, having a width wider than that of the cover 120, while pressing against the insulation member 130, so that the sealing performance between the cover 120 and the insulation member 130 may be improved.

As illustrated in FIG. 4, the heat-resistance member 123, according to the first embodiment, may be disposed in the internal cavity 120a of the cover 120. For example, the heat-resistance member 123 may be in the internal cavity 120a of the cover 120 and on the entire surface of the ribs 121. The heat-resistance member 123 may include any suitable material withstanding a high temperature of about 100° C. to 700° C., e.g., at least one of a heat-resistance tape, an insulation coated metal plate and a heat-resistance paint. Accordingly, in a case where a high-temperature gas is degassed and exhausted from the vent portions 13 of the battery cells 10, it is possible to prevent the cover 120 from being damaged or deformed by the high-temperature gas.

As the charging/discharging of the battery cells 10 is performed, gas may be generated as byproducts of the electrode plates and the electrolyte. The gas may be exhausted through the vent portions 13, followed by exhaustion through the cover 200 and the outlet 125 in the cover 120. For example, the outlet 125 may preferably be formed in a T shape having openings on left and right sides thereof, as illustrated in FIGS. 1-2. For example, the outlet 125 may include a first extension protruding from a side of the cover 120 and a second extension intersecting the first extension. The second extension may be perpendicular to the first extension. The T-shaped outlet 125 may have no influence on an adjacent battery module 100. For example, the outlet 125 may not contact an adjacent battery module 100. However, the shape of the outlet 125 is not limited thereto.

The insulation member 130 may be formed in a single body, e.g., as one piece. The insulation member 130 may be a gasket made of a heat-resistance material so as to prevent leakage of the gas. As the charging/discharging of the battery cells 10 is performed, heat may be generated from the battery cells 10. The plurality of battery cells 10 may generate a high-temperature heat around the circumference thereof, and the high-temperature heat may be absorbed by the heat-resistance member 130. If an insulation member is not made from a heat resistant material, the heat may melt the insulation member mounted to the battery cells 10. In a case where the insulation member is melted by the high-temperature heat, the sealing performance between the insulation member and the cover 120 may be decreased, causing the gas to leak.

Generally, an outer case of the battery cell may include metal, and the cover 120 may include a plastic resin. When the battery cells 10 and the cover 120 contact each other, the contact between the battery cells 10 and the cover 120 may not be easy because the battery cells 10 and the cover 120 may be formed from different materials. For example, the cover 120 may not sufficiently contact or join with the battery cells 10, once mounted on the battery cells 10. As such, gas may leak from portions or gaps between the cover 120 and the battery cells 10. In order to solve such a problem, a gasket may be provided between the battery cells 10 and the cover 120. Thus, the gasket, i.e., insulation member 130, may facilitate achieving a tighter seal between the battery cell In a case where the insulation member 130 is formed from a single body (e.g, one piece), the insulation member 130 may simultaneously overlap the plurality of vent portions 13 of the plurality of the battery cells 10. A plurality of openings 131 in the insulation member 130, corresponding in position to the vent portions 13, may be provided in the insulation member 130. The size of the opening 131 may preferably be identical to or greater than that of the corresponding vent portion 13. If the size of the openings 131 is identical to or greater than that of the vent portion 13, the insulation member 130 may not contact the high-temperature gas exhausted from the vent portions 13. Thus, a likelihood of the insulation member 130 to be melted by the high-temperature gas may be reduced further.

The battery cell 10 may include a battery case having an opening region (not shown) and a cap plate 14 that seals the opening region. The battery case may accommodate an electrode assembly and an electrolyte. Here, the electrode assembly may be composed of a positive electrode plate, a negative electrode plate, and a separator interposed between the electrode plates. A positive electrode terminal 11 may be connected to the positive electrode plate and a negative electrode terminal 12 may be connected to the negative electrode plate. The positive electrode terminal 11 and the negative electrode terminal 12 may protrude from opposing ends of the cap plate 14. The positive and negative electrode plates that form the electrode assembly may generate energy through a reaction with the electrolyte, and the energy may be transferred outside of the battery cell 10 through the positive and negative electrode terminals 11 and 12.

In a case where the pressure of gas generated inside of the battery cell 10 is a predetermined value or more, the vent portion 13, provided between the positive and negative electrode terminals 11 and 12 of the cap plate 14, may serve as a path through which gas may be exhausted from the battery cell 10. Thus, the vent portion 13 may prevent the battery cell 10 from being broken by the internal pressure of the battery cell 10.

According to this embodiment, the plurality of battery cells 10 may be aligned in one direction. For example, the battery cells 10 may be aligned parallel to one another so that wide front surfaces of adjacent battery cells 10 are opposite or adjacent to each other. The vent portions 13 may be provided at, e.g., central, portions of the respective battery cells 10. The vent portions 13 may be arranged approximately in a straight line along the aligned battery cells 10. For example, the vent portions 13 of the battery cells 10 may be aligned in a single row. For example, the positive electrode terminal 11 of one battery cell 10 and the negative electrode terminal 12 of another adjacent battery cell 10 may be electrically connected to each other by a bus-bar, formed of metal.

A housing 110 may include a pair of end plates 111 provided to be spaced apart from each other and a plurality of connection members that connect the pair of the end plates 111 to each other. The connection members may include side brackets that connect side surfaces of the end plates 111 to each other and a bottom bracket 113 that connects bottom surfaces of the end plates 111. The plurality of battery cells 10 may be accommodated between the pair of the end plates 111.

The pair of end plates 111 may come in surface contact with the respective outermost battery cells 10 so as to pressurize the plurality of battery cells 10 toward each other. For example, the end plates 111 may tightly hold the plurality of battery cells 10 together. One end of a side bracket 112 may be connected to one end plate 111, and another end of the side bracket 112 may be connected to another end plate 111, so as to support both sides of the plurality of battery cells 10. The bottom surfaces of the battery cells 10 may be supported by a bottom bracket 113, and both ends of the bottom bracket 113 may be connected to the pair of the end plates 111, respectively.

The plurality of battery cells 10, supported by the end plates 111, the side brackets 112, and the bottom bracket 113, may be aligned so that the positive and negative electrode terminals 11 and 12 are alternately provided inside of the housing 110. The positive and negative electrode terminals 11 and 12 of the plurality of the battery cells 10 may be connected in series using the bus-bars. The connection structure and number of battery cells 10 may be variously modified, according to the design of the battery module 100.

Hereinafter, a battery module according to a second embodiment will be described with reference to FIG. 5, particularly with respect to differences of the second embodiment from the first embodiment.

Figure 5:
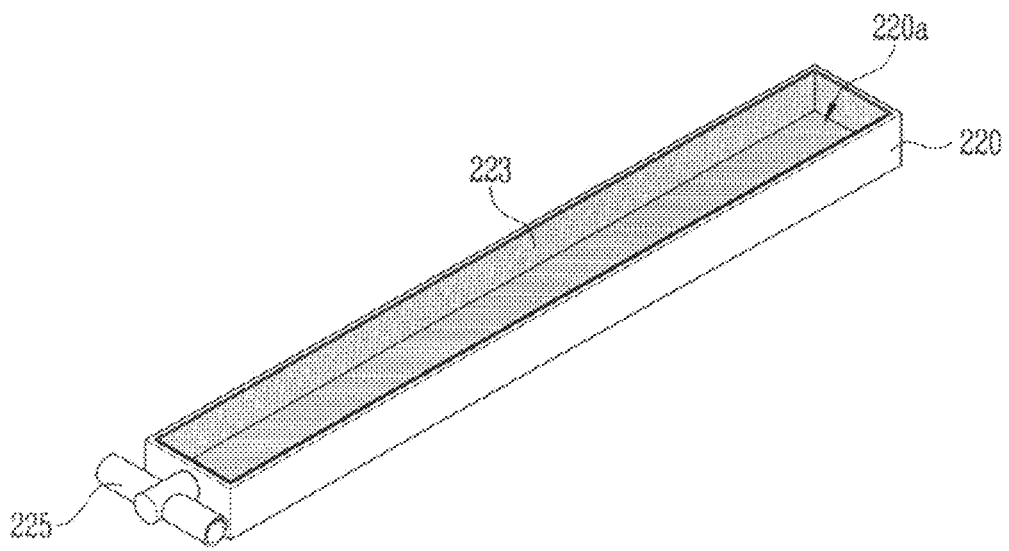
FIG. 5 illustrates a perspective view of a rotated cover according to a second embodiment.

FIG. 5 illustrates a perspective view of a rotated cover according to a second embodiment.

While the cover 120 of the first embodiment may have the ribs 121 formed inside thereof (see FIG. 4), a cover 220 according to the second embodiment (shown in FIG. 5) may have the shape of a hexahedron having no ribs. In detail, cover 220 may have one side opened in one direction, and may be mounted on the battery cells 10 so that the opened side of the cover 220 faces the vent portions 13. An internal cavity 220a of the cover 220 may not include the ribs 121. The cover 220 may include an outlet 225 for gas at one end thereof. The cover 220 may closely contact the insulation member 130. As such, the cover may form a flow path of gas that is connected to the outlet 225. For example, gas that exits the insulation member 130 may flow through the cover 220 to the outlet 225.

A heat-resistance member 223, according to this embodiment, may be provided on the entire surface of the internal cavity 220a of the cover 220. The heat-resistance member 223 may be at least one selected from a heat-resistance tape, an insulation coated metal plate, and a heat-resistance paint, which endure a high temperature of about 100° C. to about 700° C. Accordingly, in a case where a high-temperature gas is degassed and exhausted from the vent portions 13 of the battery cells 10, it may be possible to prevent the cover 220 from being damaged or deformed by the high-temperature gas.

Hereinafter, a battery module according to a third embodiment will be described with reference to FIG. 6, particularly with respect to differences of the third embodiment from the first and second embodiments.

Figure 6:
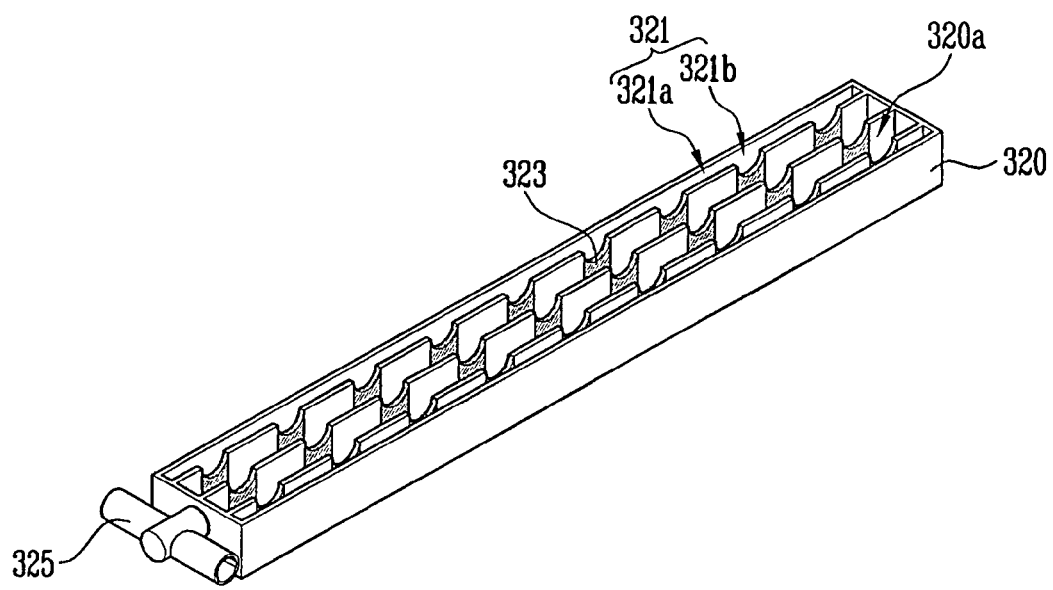
FIG. 6 illustrates a perspective view of a rotated cover according to a third embodiment.

FIG. 6 illustrates a perspective view of a rotated cover according to a third embodiment.

Like the cover 120 of the first embodiment, having the ribs 121 formed in the internal cavity 121a thereof (see FIG. 4), a cover 320, according to the third embodiment, may have the shape of a hexahedron with one side opened in one direction. The cover 320 may have ribs 321 that extend along the length of the cover 320. The ribs 321 may have contact portions 321a that contact the insulation member 130 and non-contact portions 321b between the contact portions 321a that correspond in position to the vent portions 13. The non-contact portions 321b may have open portions or concave edges that correspond in position to the openings 131 of the insulation member 130. The concave edges may be spaced from edges of adjacent contact portions 321a. Like the first embodiment, the ribs 321 may be inside of, e.g., in the internal cavity of, the cover 320, to improve the sealing performance, e.g., provide a tighter seal, between the cover 320 and the insulation member 130.

Unlike the first and second embodiments, in the cover 320 according to the third embodiment, a heat-resistance member 323 may be selectively provided on the ribs 321, e.g., only on the non-coating portions 321b. The non-coating portion 321b of the cover 320 may be above the vent portions 13, thereby substantially and directly contacting a high-temperature gas degassed and exhausted from the vent portions 13. Thus, it may be possible to prevent the cover 320 from being damaged or deformed by the high-temperature gas, even when the heat-resistance member 323 is selectively provided only to the non-contact portion 321b.

Hereinafter, a battery module, according to a fourth embodiment, will be described with reference to FIG. 7, particularly with respect to differences of the second embodiment from the first to third embodiments.

Figure 7:
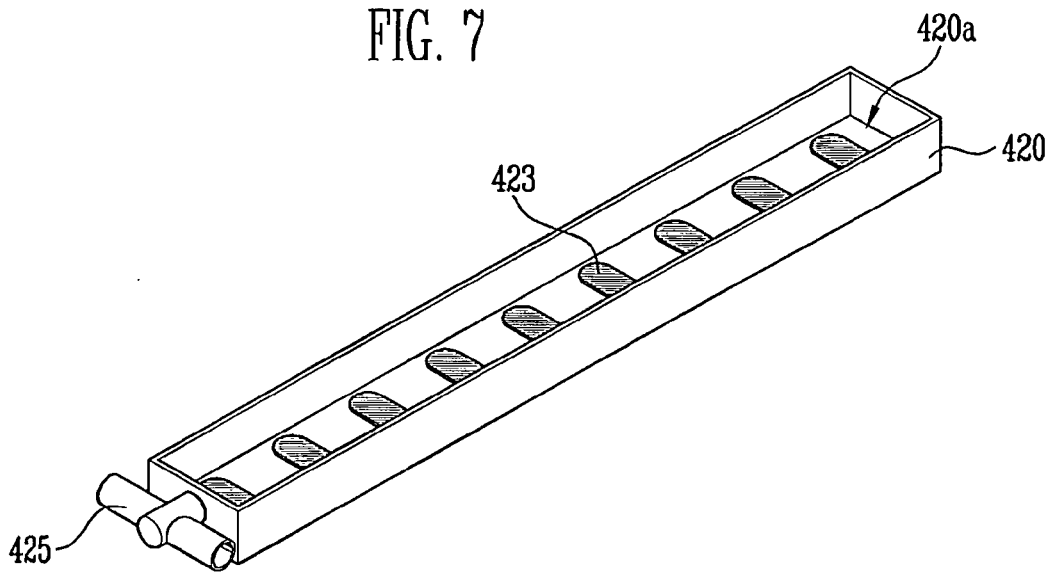
FIG. 7 illustrates a perspective view of a rotated cover according to a fourth embodiment.

FIG. 7 illustrates a perspective view of a rotated cover according to a fourth embodiment.

Like the cover 320 of the third embodiment having the ribs 321 formed in the internal cavity 320a thereof (see FIG. 6), a cover 420, according to the fourth embodiment, may have the shape of a hexahedron with one side opened in one direction. The cover 420 may be mounted on the battery cells 10 so that the opened side of the cover 420 faces the vent portions 13. The cover 420 may have an outlet 425 for gas at one end thereof. The cover 420 may closely contact the insulation member 130. As such, the cover may include a flow path of gas in an internal cavity 420a thereof, that is connected to the outlet 425. For example, gas that exits the insulation member 130 may flow through the cover 420, e.g., internal cavity, to the outlet 425.

Unlike the first and second embodiments, the cover 420, according to the fourth embodiment, may not include ribs, and may include a heat-resistance member 423 selectively provided on internal surfaces of the cover 420. For example, the heat resistance member 423 may be provided on portions corresponding in position to the vent portions 13. The portions of the cover 420 that correspond in position with the vent portion 13 may directly and substantially contact a high-temperature gas degassed and exhausted from the vent portions 13. Thus, it may be possible to protect the cover 420 from being damaged or deformed by the high-temperature gas even when the heat-resistance member 423 is selectively provided to only the portions of the cover 420 corresponding in position to the vent portions 13.

As described above, according to one or more embodiments, a battery module may include a heat-resistant material inside a cover overlapping vent portions, thereby preventing or substantially minimizing damage to the cover, e.g., potentially due to exhaustion of high-temperature gas. As such, battery modules, according to embodiments, may provide improved productivity by effectively controlling gas generated from a plurality of battery cells through a simplified operating process. Further, the battery module may effectively prevent leakage of gas that has a bad influence on surroundings, by providing a space in which a flow path of gas may be formed, that is more effectively sealed from surroundings.

Embodiments may provide a battery module capable of easily controlling a high-temperature gas generated from a plurality of battery cells. Embodiments may also provide a battery module capable of preventing damage or deformation caused by a high-temperature gas generated in a plurality of battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A battery module, comprising:
    a plurality of battery cells aligned in one direction, each battery cell having a vent portion; and
    a cover over the vent portions of the battery cells, the cover including:
        an internal cavity, at least a portion of the internal cavity including a heat-resistance member, and
        at least one rib including non-contact portions on a surface thereof facing and covering the vent portions.

2. The battery module as claimed in claim 1, further comprising an insulation member interposed between the vent portions and the cover.

3. The battery module as claimed in claim 1, wherein:
    the cover is mounted on the battery cells,
    the cover has a hexahedral shape defining the internal cavity, the hexahedral shape having one side open, and
    the open side faces the vent portions.

4. The battery module as claimed in claim 3, wherein the heat-resistance member covers the entire internal cavity of the cover.

5. The battery module as claimed in claim 3, wherein the heat-resistance member is only on portions of the internal cavity of the cover corresponding in position to the vent portions.

6. The battery module as claimed in claim 3, wherein the at least one rib extends along a length of the cover in a length direction.

7. The battery module as claimed in claim 6, wherein the at least one rib includes contact portions adjacent to the non-contact portions, the contact portions contacting and pressing against an insulation member, and the non-contact portions vertically aligned with the vent portions.

8. The battery module as claimed in claim 7, wherein the heat resistance member is on outer surfaces of the at least one rib and an entire inner surface of the internal cavity.

9. The battery module as claimed in claim 7, wherein the heat-resistance member is only on the non-contact portion.

10. The battery module as claimed in claim 1, wherein the heat-resistance member is configured to withstand a high temperature of about 100° C. to about 700° C. and is at least one of a heat-resistance tape, an insulation coated metal plate, and a heat-resistance paint.

11. The battery module as claimed in claim 1, further comprising an insulation member interposed between the vent portions and the cover, the insulation member being a single unit.

12. The battery module as claimed in claim 1, further comprising an insulation member interposed between the vent portions and the cover, the insulation member including a plurality of openings corresponding in position to the vent portions.

13. The battery module as claimed in claim 12, wherein a size of an opening of the insulation member is the same as or larger than a size of a corresponding vent portion.

14. The battery module as claimed in claim 1, further comprising an insulation member interposed between the vent portions and the cover, the insulation member including a heat-resistance material.

15. The battery module as claimed in claim 1, further comprising an insulation member interposed between the vent portions and the cover, the insulation member being a gasket.

16. The battery module as claimed in claim 1, further comprising an insulation member interposed between the vent portions and the cover, the insulation member being wider than a width of the cover.

17. The battery module as claimed in claim 1, further comprising an insulation member interposed between the vent portions and the cover, the cover including a flow path of gas exiting the insulation member, wherein the cover further comprises an outlet extending from one side of the cover.

18. The battery module as claimed in claim 1, further comprising a housing accommodating the plurality of battery cells,
wherein the housing includes a pair of end plates spaced apart from each other to accommodate the plurality of battery cells therebetween, side brackets that connect side surfaces of the end plates to each other, and a bottom bracket that connects bottom surfaces of the end plates to each other.

19. The battery module as claimed in claim 1, wherein at least a portion of the heat resistance member overlaps the vent portions.

20. The battery module as claimed in claim 7, wherein the non-contact portions are shorter than the contact portions in a height direction of the cover, the height direction being perpendicular to both the length direction of the cover and a width direction of the cover.

* * * * *